United States Patent [19]

Cherin et al.

[11] 3,912,574
[45] Oct. 14, 1975

[54] APPARATUS FOR SPLICING PAIRS OF ARRAYED OR INDIVIDUAL FIBERS UTILIZING OPTICAL FIBER ALIGNING GROOVES

[75] Inventors: Allen Henry Cherin, Doraville; Philip Jay Rich, Atlanta, both of Ga.

[73] Assignee: Bell Telephone Laboratories, Incorporated, Murray Hill, N.J.

[22] Filed: Oct. 24, 1974

[21] Appl. No.: 517,420

[52] U.S. Cl. ............... 156/502; 156/158; 156/296; 156/304; 350/96 B
[51] Int. Cl.² ........................................ B65H 69/06
[58] Field of Search ............ 29/464, 466, 467, 468, 29/474.4, 203 J, 203 P; 156/158, 161, 166, 304, 502, 494, 296, 459, 460; 350/96 B, 96 C; 65/4

[56] References Cited
UNITED STATES PATENTS

| | | | |
|---|---|---|---|
| 3,614,415 | 10/1971 | Edelman | 350/96 B |
| 3,674,013 | 7/1972 | Polanyi | 350/96 B |
| 3,768,146 | 10/1973 | Braun et al. | 350/96 B |
| 3,810,802 | 5/1974 | Buhite et al. | 156/158 |
| 3,864,018 | 2/1975 | Miller | 65/4 |

*Primary Examiner*—William A. Powell
*Assistant Examiner*—Brian J. Leitten
*Attorney, Agent, or Firm*—C. E. Graves

[57] ABSTRACT

Mating pairs of arrayed optical fibers are axially aligned and abutted preparatory to splicing, by being urged down an inclined guide ramp and into respective fiber receiving grooves. The splice is completed by applying index matching material and a splice connector plate to the abutted joint.

7 Claims, 7 Drawing Figures

APPARATUS FOR SPLICING PAIRS OF ARRAYED OR INDIVIDUAL FIBERS UTILIZING OPTICAL FIBER ALIGNING GROOVES

Field of the Invention

The present invention is concerned with the construction and maintenance of an optical fiber transmission medium. More specifically, it relates to a method of splicing one or more pairs of optical fibers under plant or field conditions.

Background of the Invention

The advantages of transmitting information via optical fiber light transmission medium are widely recognized in the Telecommunications industry. However, the problem of optical fiber splicing is a major challenge to the maximum development of this valuable medium.

Several researchers have already directed their attention to this problem. Examples are D. L. Bisbee in his article entitled, "Optical Fiber Joining Techniques," *Bell System Technical Journal*, No. 10, Dec. 1973, and E. A. J. Marcatili in his article entitled, "Research on Optical Fiber Transmissions," *Bell Laboratories Record*, Dec. 1971, pages 331–338.

The present invention has one object to efficiently construct low loss optical fiber splices in a field or plant environment without a minimum of specialized equipment.

Another object of the invention is to take advantage of commercially available, low-cost materials so as to make optical fiber splicing feasible in situations where it may not be otherwise.

SUMMARY OF THE INVENTION

Respective ones of one linear array of optical fibers in a ribbon structure may be axially aligned and abutted with the respective ones of an identical second array of optical fibers by using two guide ranges inclined at either end of a surface with fiber-receiving grooves. In one embodiment, pairs of ribbons each containing spaced optical fibers are placed in opposing ribbon guide grooves. Each pair of fiber ribbons is then slid down the ribbon guide grooves. The individual fibers encounter respective fiber aligning grooves at a slight angle, the grooves having the same center-to-center spacing as that of the arrayed fibers. Because of the incline, a downward bias force is generated in each fiber, tending to hold each fiber snugly in its groove. Axial alignment of the mating fibers is thus promoted.

The splice is completed by applying index matching material and a splice connector plate to the abutted joint. The splicing technique is applicable to joining of single fibers, or mating fibers in a pair of ribbons, or several pairs of ribbons containing multiple fibers.

Detailed Description of Illustrative Embodiments

Figure 1:
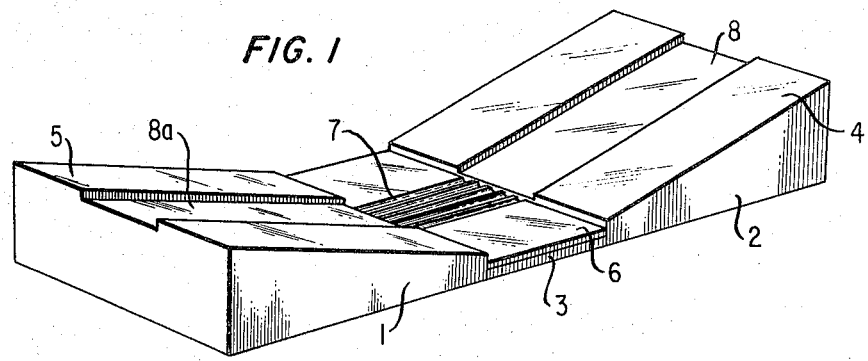
FIG. 1 is a perspective view of the guide ramp assembly containing the ribbon guide grooves and fiber aligning grooves.

The optical fiber aligning assembly illustrated in FIG. 1 is intended to join the mating fibers of two fiber ribbons. It consists of identical guide ramps 1 and 2, each having a slightly inclined planar surface 4 and 5 containing ribbon guide grooves 8, 8a, respectively.

A plate 3 is disposed between the ramps 1, 2 to receive a plastic substrate 6 with parallel fiber aligning grooves 7 along its top surface. The ends of each guide groove 8, 8 a, lead in at a slight angle to the bottom surfaces of fiber aligning grooves 7.

Figure 2:
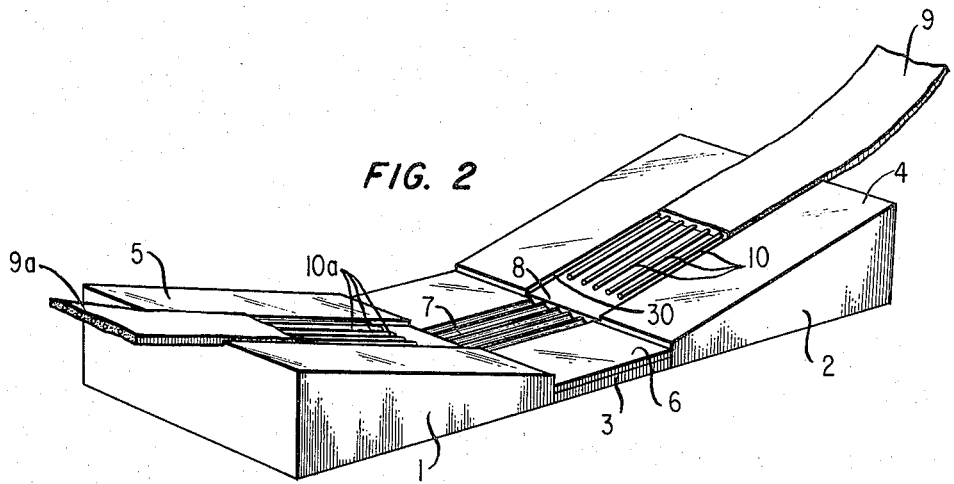
FIG. 2 shows the fiber ribbons being slid into the fiber aligning grooves.
Figure 3:
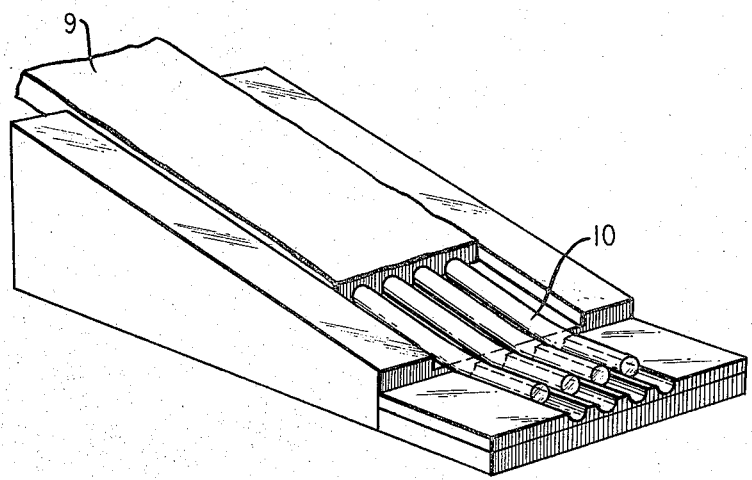
FIG. 3 is a close-up view of the fibers seated in the fiber aligning grooves.

As shown in FIG. 2, two fiber ribbons 9, 9a each containing optical fiber arrays 10, 10a, respectively, are introduced into grooves 8, 8a.

One of the edges, for example, edge 30 of each guide groove is located at the same transverse distance from the centers of the fiber aligning grooves 7 as the edge of the fiber ribbon is from the axes of the fibers within the ribbon. Edge 8a thus becomes a reference surface to assure proper initial transverse positioning of the fibers. The fiber ribbons 9, 9a are then slid down, the ribbon guide grooves 8, 8a towards each other, and the fiber arrays 10, 10a enter into opposing ends of the respective fiber aligning grooves 7. The fibers undergo a slight bend, and the resulting bending stress in each fiber biases that fiber downwardly and snugly into its groove. The fibers to be mated thus are axially aligned when they enter into the fiber aligning grooves.

Figure 4:
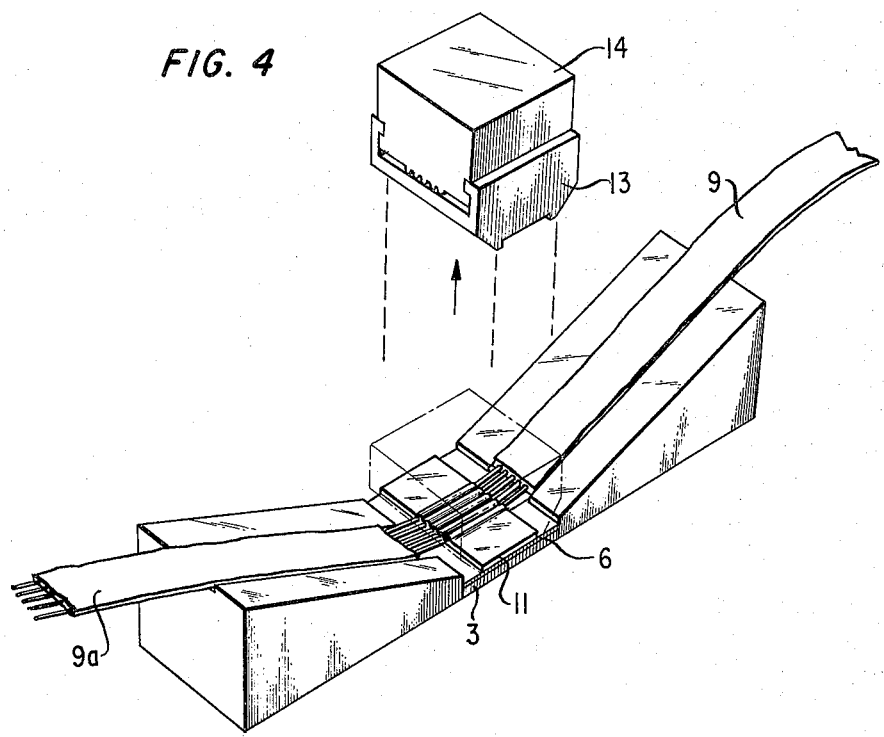
FIG. 4 is a perspective view of a completed splice.

The fiber ends are abutted in axial alignment as above, and the abutted joints are then covered with splice connector cover plate 11, shown in FIG. 4. The splice may then be completed as by applying pressure to the splice connector cover plate 11 to cause it to chemically adhere to plastic substrate 6. Advantageously, plate 11 may be positioned and adhered to the plastic substrate 6 in one operation by placing the plate 11 in a cover plate holder 13 which is attached to embossing head 14 as illustrated in FIG. 4. In all cases, an index matching material should be placed between each pair of abutted fiber ends.

The fiber aligning grooves 7 may be pre-engraved, pre-embossed, or embossed while positioned on the ramp connector plate 3 by use of embossing head 14 shown in FIG. 4.

Figure 5:
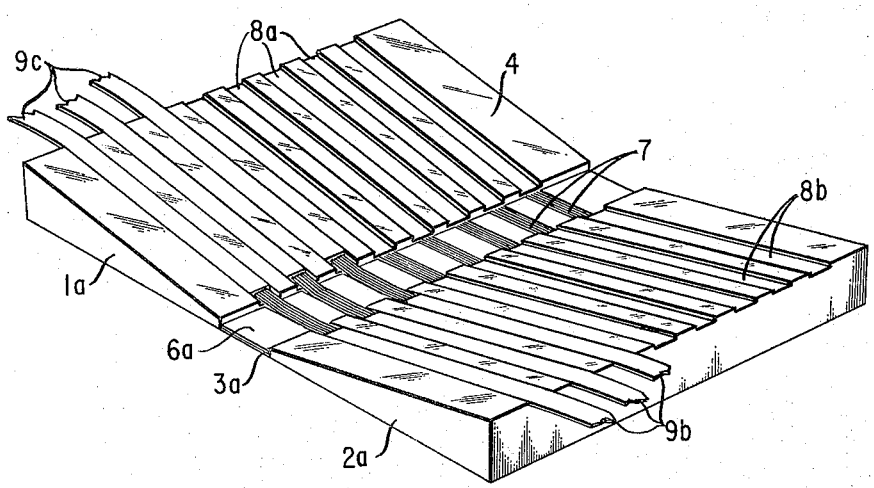
FIG. 5 is a perspective view of the guide ramp assembly with expanded capacity.

The basic principle of this invention may be extended so that several pairs of ribbons are spliced in one operation, for example as illustrated in FIG. 5. The components include guide ramps 1a, 2a which have multiple guide grooves 8b, 8c, served by multiple sets of fiber-receiving grooves 7. The method of use is similar to that described with respect to FIG. 2.

Figure 6:
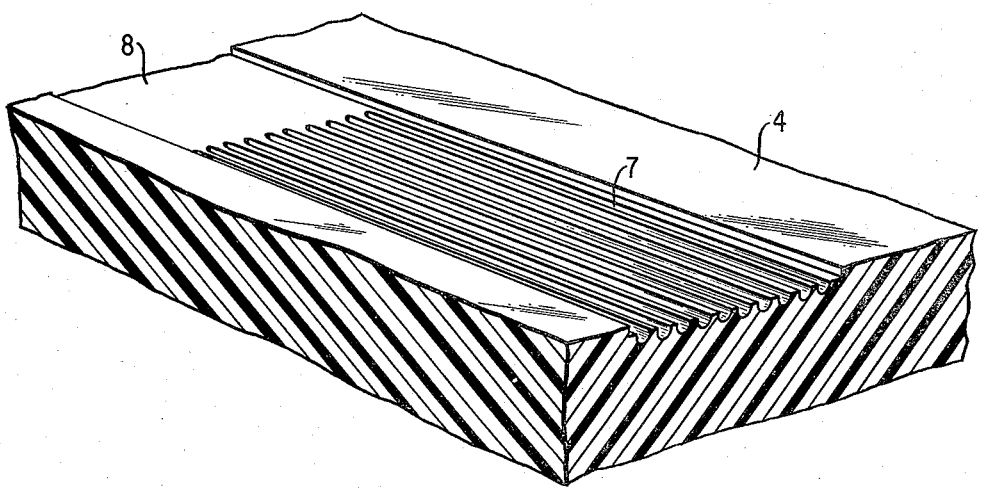
FIG. 6 is a close-up view of a cross section of the thin chip ramp assembly.
Figure 7:
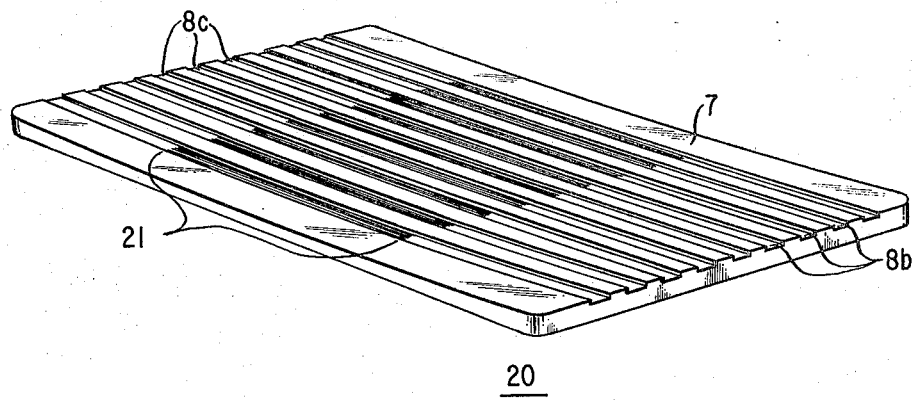
FIG. 7 is a perspective view of the thin chip ramp assembly.

Arrayed optical fibers may also be spliced in accordance with the teachings of this invention by using a unitary thin chip 20 illustrated in FIG. 7. The top surfaces of the chip 20 are slightly inclined on either side of the center portion with respect to the center, creating two fiber ribbon lead-in ramps functionally the same as those of FIG. 5. The chip 20 includes parallel ribbon guide grooves 8a, 8b. Each pair of opposing grooves 8b, 8c, lead into a center position 21 which includes several equally spaced fiber aligning grooves 7, a close-up view of which is illustrated in FIG. 6.

Pairs of fiber ribbons 9 are placed in respective opposing ends of ribbon guide grooves 8. The fibers are abutted and spliced in accordance with the procedure already stated above, except in this case the ramp portions become a permanent part of the completed splice. The embodiment involving thin chip 20 has the additional advantage of being relatively inexpensive, since it may be constructed inexpensively as by injection molding.

Pursuant to the most elemental inventive embodiment, a single pair of optical fibers may be abutted and spliced in accordance with the teachings of this invention. For example, fiber ribbon 9 illustrated in FIG. 2 may be constructed so as to contain a single fiber, in which case a single pair of fibers could be abutted and spliced pursuant to the above-stated procedure. Or, a single pair of fibers may be fed directly into opposing ends of a single fiber aligning groove 7, of the apparatus depicted in FIG. 7, guided by manual means.

In all cases, a downward stress should be maintained on the fiber ends 10 as they are entered, at a slight angle, into the fiber aligning grooves 7 so as to cause the fibers 10 to be biased along the bottom of the fiber aligning groove 7 and into abutment, and kept in that position until the splice is completed.

It is to be understood that the embodiments described herein are merely illustrative of the principles of the invention. Various modifications may be made thereto by persons skilled in the art without departing from the spirit and scope of the invention.

What is claimed is:

1. Apparatus for joining optical fibers of a first linear array in axial alignment with corresponding fibers of a second linear array comprising:
   a surface comprising parallel fiber-aligning grooves having the same center-to-center spacing as the fibers of said arrays;
   means for advancing the fibers of said first and said second arrays into their respective said grooves toward each other and at a small acute angle with respect to the grooves, thus to generate within each said fiber a downwardly biasing stress when each said fiber contacts its said groove;
   said biasing stress maintaining each said fiber in contact with its said groove, the ends of respective corresponding fibers meeting in opposing axial alignment, and
   means for securing said fibers in said axial alignment.

2. Apparatus pursuant to claim 1 wherein said linear arrays comprise fibers contained in a ribbon structure having at least one fiber-locating edge; and said advancing means comprises a ramp having a flat floor with an associated guide surface against which said ribbon edge abuts for laterally positioning the fibers of each said array with respect to said grooves.

3. Apparatus pursuant to claim 2, further comprising a flat-surfaced panel recessed below and connecting the ends of said ramps; and a thin chip containing said grooves placed in said recess atop said panel and oriented to receive said advancing fibers.

4. Apparatus for joining a plurality of first linear arrays of optical fibers with a like plurality of second linear arrays of optical fibers comprising:
   a surface containing parallel fiber alignment grooves arranged in plural groups, each said group of grooves designed to receive a selected pair of fiber arrays to be joined;
   means for advancing the selected fiber arrays to be joined into their respective grooves, with the fiber axes slightly inclined to the grooves in amounts sufficient to generate within each said fiber a downwardly biasing stress after each said fiber contacts its said groove;
   the ends of respective corresponding fibers meeting in abutting coaxial alignment; and
   means for securing said fibers in said axial alignment.

5. The apparatus described in claim 4, fabricated as a one-piece unitary structure.

6. Apparatus pursuant to claim 5, wherein said linear arrays each comprise fibers contained in a ribbon structure having at least one fiber-locating edge; and each said advancing means comprises a ramp having a flat floor with an associated guide surface against which a ribbon edge abuts for laterally positioning the fibers of each said array with respect to their said grooves.

7. Apparatus for joining a first optical fiber to a second optical fiber, comprising:
   a surface having a fiber aligning groove; and
   means for advancing said first and said second fibers into said groove toward each other and at a small angle of inclination with respect to the longitudinal direction of said groove thus to generate within each fiber a downwardly biasing stress after each said fiber contacts said groove;
   said stress causing each said fiber to stay in contacting engagement with said groove;
   the ends of said first and said second fibers meeting in abutting axial alignment.

* * * * *